United States Patent
Sun et al.

(10) Patent No.: US 9,615,664 B2
(45) Date of Patent: Apr. 11, 2017

(54) MOUNTING STRUCTURE AND WALL-MOUNTED DISPLAY DEVICE

(71) Applicant: BOE Technology Group Co., Ltd., Beijing (CN)

(72) Inventors: Zhihui Sun, Beijing (CN); Zhiguo Shen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/741,537

(22) Filed: Jun. 17, 2015

(65) Prior Publication Data
US 2016/0278526 A1    Sep. 29, 2016

(30) Foreign Application Priority Data
Mar. 23, 2015   (CN) .......................... 2015 1 0128723

(51) Int. Cl.
*A47B 96/06*   (2006.01)
*E04G 3/00*    (2006.01)
(Continued)

(52) U.S. Cl.
CPC ........... *A47B 97/001* (2013.01); *F16M 13/02* (2013.01)

(58) Field of Classification Search
USPC .................. 40/605, 606.01, 617, 624, 757; 248/447.1, 447.2, 489, 495, 228.1, 228.6,
(Continued)

(56) References Cited

U.S. PATENT DOCUMENTS

| | | | | |
|---|---|---|---|---|
| 1,886,898 A | * | 11/1932 | Overholtz | ........... G09F 15/0012 40/624 |
| 2,942,366 A | * | 6/1960 | Pfaff, Jr. | ............. G09F 15/0037 248/230.1 |

(Continued)

FOREIGN PATENT DOCUMENTS

| | | |
|---|---|---|
| CN | 2073078 U | 3/1991 |
| CN | 201526780 U | 7/2010 |

(Continued)

OTHER PUBLICATIONS

First Office Action, including Search Report, for Chinese Patent Application No. 201510128723.4, dated Mar. 29, 2016, 11 pages.
(Continued)

*Primary Examiner* — Terrell McKinnon
*Assistant Examiner* — Michael McDuffie
(74) *Attorney, Agent, or Firm* — Westman, Champlin & Koehler, P.A.

(57) ABSTRACT

Embodiments of the present invention disclose a mounting structure for display device. The mounting structure comprises at least two mounting assemblies, and each mounting assembly comprises: a first component mounted securely to the display device; a second component mounted to a beam; and a first screw rod mounted horizontally to the first component, the first screw rod being configured to be rotatable but non-displaceable relative to the first component. The second component is configured to be mounted to the first screw rod in a non-rotatable manner. Embodiments of the present invention further disclose a wall-mounted display device comprising a display device and the mounting structure.

18 Claims, 4 Drawing Sheets

(51) Int. Cl.
*F16B 1/00* (2006.01)
*G09F 7/18* (2006.01)
*A47B 97/00* (2006.01)
*F16M 13/02* (2006.01)

(58) Field of Classification Search
USPC ........ 248/230.1, 230.6, 231.71, 231.85, 340, 248/475.1, 476, 227.1, 227.4, 316.1; 361/679.21, 679.22, 679.26
See application file for complete search history.

(56) References Cited

U.S. PATENT DOCUMENTS

| | | | | |
|---|---|---|---|---|
| 2,965,339 | A * | 12/1960 | Denton | A47G 1/1613 248/495 |
| 3,908,297 | A * | 9/1975 | Schmutzler | B41J 29/15 40/351 |
| 4,372,223 | A | 2/1983 | Iwatani | |
| 6,578,812 | B2 * | 6/2003 | Lemire | A47G 1/1613 248/466 |
| 6,799,658 | B2 * | 10/2004 | Cogar | E04G 3/20 182/150 |
| 7,316,379 | B1 * | 1/2008 | Graham | F16M 11/18 248/298.1 |
| 7,401,429 | B1 * | 7/2008 | Kvortek | G09F 15/00 211/191 |
| 7,866,075 | B2 * | 1/2011 | Meeker | G09F 7/18 248/466 |
| 8,276,864 | B2 * | 10/2012 | Ye | F16M 11/04 248/287.1 |
| 8,336,235 | B2 * | 12/2012 | Biondan | G09F 7/00 40/124.5 |
| 8,369,103 | B2 * | 2/2013 | Mitsuhashi | F16M 11/00 248/917 |
| 8,482,907 | B2 * | 7/2013 | Take | F16M 13/02 248/917 |
| 8,599,543 | B2 * | 12/2013 | Tokikawa | F16M 13/02 248/917 |
| 9,027,893 | B2 * | 5/2015 | Cheng | F16M 13/022 248/201 |
| 2005/0145769 | A1 * | 7/2005 | Ives | G09F 15/0087 248/447.1 |
| 2006/0000132 | A1 * | 1/2006 | Bertheaume | B01D 3/14 40/617 |
| 2007/0040090 | A1 * | 2/2007 | Fay | A47G 1/1686 248/495 |
| 2008/0042027 | A1 * | 2/2008 | LaScala | B63B 17/02 248/229.15 |
| 2012/0234998 | A1 * | 9/2012 | Tomaso | F24J 2/5258 248/228.1 |

FOREIGN PATENT DOCUMENTS

| | | |
|---|---|---|
| CN | 202142260 U | 2/2012 |
| CN | 202402892 U | 8/2012 |
| CN | 202612997 U | 12/2012 |
| CN | 204098298 U | 1/2015 |

OTHER PUBLICATIONS

Second Office Action, including Search Report, for Chinese Patent Application No. 201510128723.4, dated Nov. 21, 2016, 13 pages.

* cited by examiner

MOUNTING STRUCTURE AND WALL-MOUNTED DISPLAY DEVICE

CROSS-REFERENCE TO RELATED APPLICATION

This application claims the benefits of Chinese Patent Application No. 201510128723.4 filed on Mar. 23, 2015 in the State Intellectual Property Office of China, whole disclosures of which is incorporated herein by reference.

BACKGROUND OF THE INVENTION

Field of the Invention

The present invention relates to the technical field of display technology, and specifically to a mounting structure and a wall-mounted display device.

Description of the Related Art

Since manufacturing tolerances exist in display screens and mounting brackets, and assembly tolerances exist between display screens and mounting brackets, relative large gaps or overlaps exist between assembled displays if no adjusting means is provided. One recently used adjustable bracket is shown in FIG. 1, which comprises a fixed bracket supporting a display device 1, the fixed bracket is provided with two wall-mounting members 3 mounted onto a mounting beam 5. Each wall-mounting member 3 is provided with a vertical adjusting bolt 2 and a horizontal adjusting bolt 4 for adjusting the member vertically and horizontally, respectively. The vertical adjusting bolt 2 and the horizontal adjusting bolt 4 are connected to the wall-mounting member 3 through threads, and only contact the mounting beam 5. Therefore, when threaded toward inside of the wall-mounting member 3, the adjusting bolts press against the mounting beam 5, so as to change gaps between the wall-mounting member 3 and the mounting beam 5 in the vertical direction and in the horizontal direction, and thereby an adjustment of position of the display device 1 is achieved. However, when threaded outwards from the wall-mounting member 3, the horizontal adjusting bolt 4 is disengaged from the mounting beam 5, such that it cannot move the wall-mounting member 3 rightward in relation to the mounting beam 5, as shown in FIG. 1. Therefore, the adjustable bracket of this type has a limitation.

Therefore, a wall-mounting structure is needed to adjust a position of a display device in horizontal and vertical directions.

SUMMARY OF THE INVENTION

The present invention has been made to overcome or alleviate at least one aspect of the above mentioned disadvantages.

Accordingly, it is an object of the present invention to provide a mounting structure and wall-mounted display device, so that the position of the wall-mounted display device can be adjusted after mounting.

According to an aspect of the present invention, there is provided a mounting structure for a display device.

According to an exemplary embodiment of the present invention, the mounting structure comprises at least two mounting assemblies, and each mounting assembly comprises: a first component mounted securely to the display device; a second component mounted to a beam; and a first screw rod mounted horizontally to the first component, the first screw rod being configured to be rotatable but non-displaceable relative to the first component. The second component is configured to be mounted to the first screw rod in a non-rotatable manner.

According to another aspect of the present invention, there is provides a wall-mounted display device.

According to an exemplary embodiment of the present invention, the wall-mounted display device comprises a display device and the mounting structure above.

In the above embodiments, a fixation frame is used to fix a display device, mounting assemblies are clamped to the mounting beam, and the fixation frame and the mounting assemblies are connected by driving component passing through smooth holes formed in a U-shaped bended structure. When a mounting assembly is adjusted in the horizontal direction, a rotation of the driving component causes a relative displacement between the U-shaped bended plate and the U-shaped bended structure, therefore a position of the display device can be adjusted forward or backward in the horizontal direction, and the adjustment of the display device is facilitated.

BRIEF DESCRIPTION OF THE DRAWINGS

The above and other features of the present invention will become more apparent by describing in detail exemplary embodiments thereof with reference to the accompanying drawings, in which.

LIST OF REFERENCE NUMBERS

Figure 1:
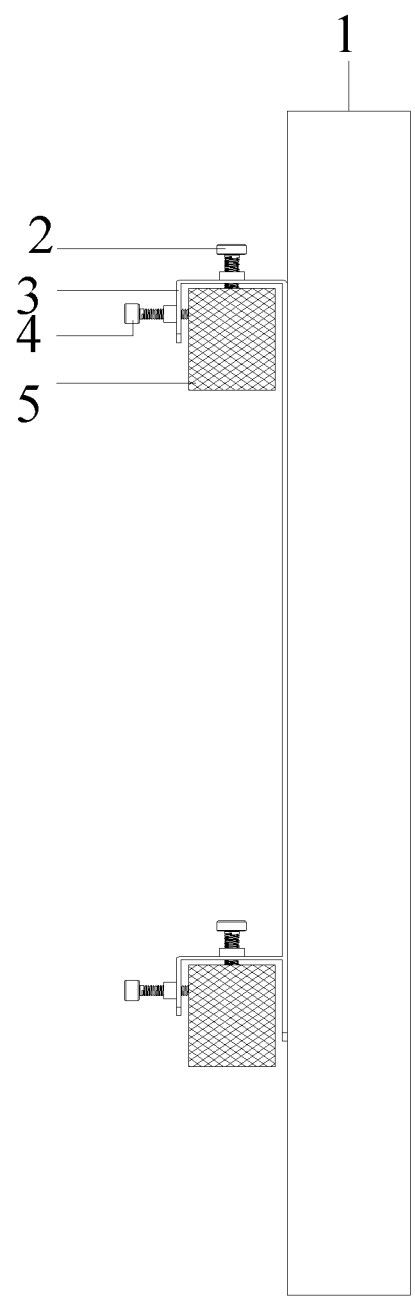
FIG. 1 is an illustrative sectional view showing a mounting structure in prior art.

1 Display device
2 Vertical adjusting bolt
3 Wall-mounting member
4 Horizontal adjusting bolt
5 Mounting beam
10 Fixation frame
11 Horizontal supporting arm
111 First horizontal supporting arm
112 Second horizontal supporting arm
12 U-shaped bended structure
13 Horizontal adjusting threaded rod
14 Nut
15 Smooth rod
16 Elongated slot
20 U-shaped bended structure
21 Vertical adjusting threaded rod
30 Mounting beam
40 Display device

DETAILED DESCRIPTION OF PREFERRED EMBODIMENTS OF THE INVENTION

In order to conveniently adjust a position of a wall-mounted display device, embodiments of the present invention provides a mounting structure and a wall-mounted display device. In the technical solution according to the embodiments of the present invention, a horizontal adjusting bolt is provide to adjust a horizontal relative position between a fixed frame and a movable frame, so as to adjust a position of a display device. Exemplary embodiments of the present disclosure will be described hereinafter in detail with reference to the attached drawings. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Figure 2:
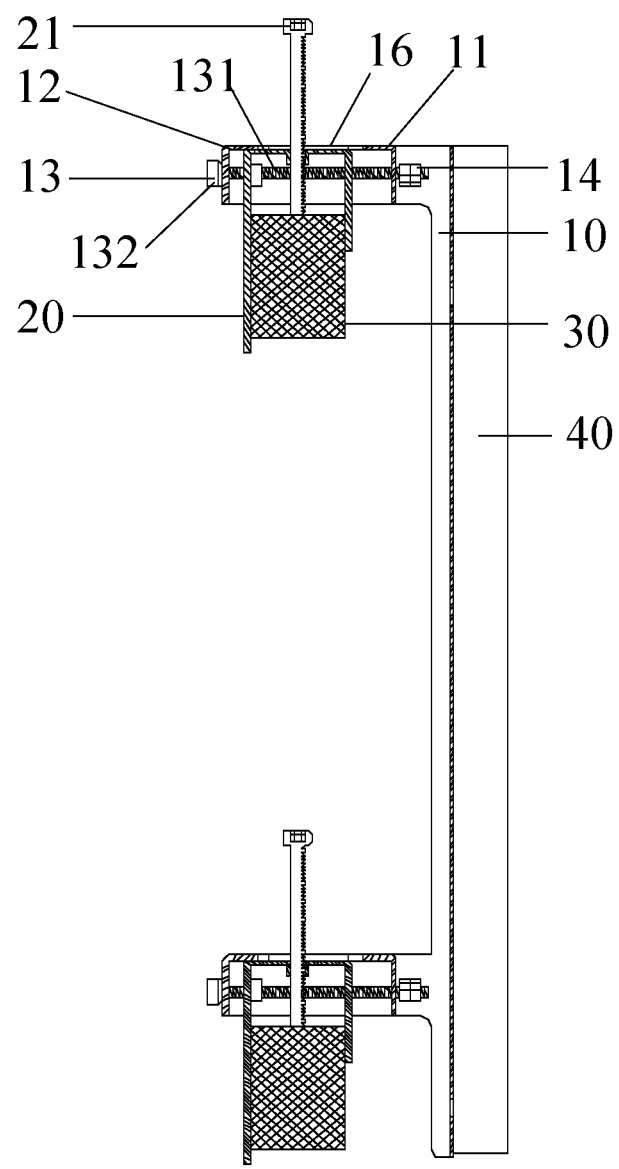
FIG. 2 is an illustrative sectional view showing a mounting structure according to one embodiment of the present invention.
Figure 3:
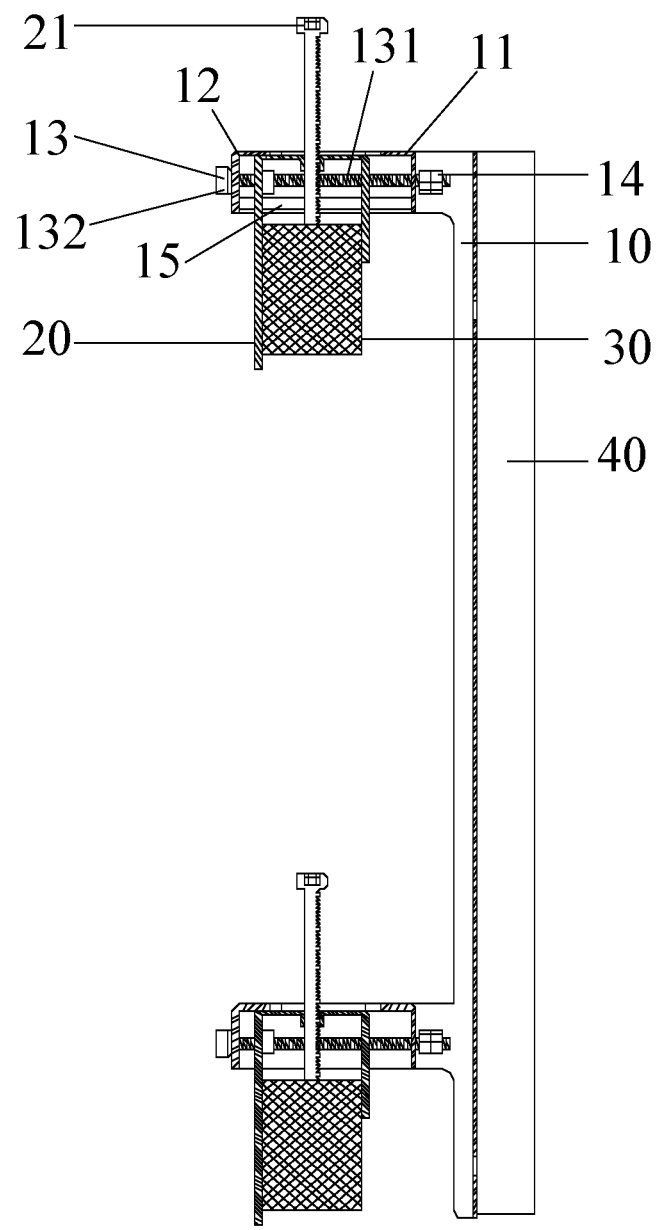
FIG. 3 is an illustrative sectional view showing a mounting structure according to another embodiment of the present invention.

As shown in FIGS. 2 and 3, a mounting structure for display device according an exemplary embodiment of the present invention comprises at least two mounting assemblies, and each mounting assembly comprises: a first component (e.g. a U-shaped bended structure 12) mounted to the display device 40; a second component (e.g. a U-shaped bended structure 20) mounted to a mounting beam 30; and a first screw rod (e.g. a horizontal adjusting threaded rod 13) mounted to the first component. The first screw rod is configured to be rotatable but non-displaceable relative to the first component, and the second component is configured to be mounted to the first screw rod in a non-rotatable manner.

Moreover, each mounting assembly further comprises a second screw rod (e.g. vertical adjusting threaded rod 21) mounted vertically to the second component, and the second screw rod is configured to match with a threaded hole of the second component and one end of the second screw rod abuts against the beam, such that when the second screw rod rotates relative to the second component, the second component moves vertically relative to the mounting beam 30.

Further, the first component comprises at least one through hole, the first screw rod comprises a threaded rod body 131 passing through the though hole and a first stopper (e.g. a head portion 132 of the horizontal adjusting threaded rod 13 at the left end thereof) and a second stopper (e.g. a nut 14 fixed to the right end of the horizontal adjusting threaded rod body 131) secured on the threaded rod body, the first stopper and the second stopper are configured to abut against two sides of the at least one though hole respectively, such that the first screw rod cannot displace relative to the through hole. If there is only one through hole, the through hole needs to have a sufficient length so as to securely hold the horizontal adjusting threaded rod 13. In an alternative embodiment, the first component comprises a first through hole and a second through hole, as shown in FIGS. 2-3. The horizontal adjusting threaded rod 13 is passed through the first through hole and the second through hole, and the head portion 132 of the horizontal adjusting threaded rod 13 is configured to abut against a side of the first through hole away from the second through hole, and the nut 14 is configured to abut against a side of the second through hole away from the first through hole, such that the horizontal adjusting threaded rod 13 cannot displace relative to the first through hole and the second through hole.

In an exemplary embodiment, the second component is mounted to the horizontal adjusting threaded rod 13 at a position between the first through hole and the second through hole.

Moreover, the first component comprises a first rotation preventing portion, the second component comprise a second rotation prevention portion cooperating with the first rotation prevention portion, such that the second component is non-rotatable relative to the first component. Specifically, in an exemplary embodiment, each mounting assembly further comprises a smooth rod 15 passing through the first component and the second component, such that the second component is non-rotatable relative to the first component.

In an alternative exemplary embodiment, the first component comprises a first abutting surface against the second component, the second component comprises a second abutting surface against the first component, and the first abutting surface and the second abutting surface are in parallel with an axial direction of the first screw rod. More specifically, the first component is formed by a first U-shaped plate (e.g. the U-shaped bended structure 12) comprising a bottom plate and a first side plate and a second side plate at two sides of the bottom plate, and the first through hole and the second through hole are formed respectively in the first side plate and the second side plate. The first abutting surface is formed on the bottom plate of the first U-shaped plate. The second component is formed by a second U-shaped plate (e.g. the U-shaped bended structure 20) comprising a bottom plate and a first side plate and a second side plate at two sides of the bottom plate, and the second abutting surface is formed on the bottom plate of the first U-shaped plate. The first side plate and the second side plate of the second U-shaped plate are formed respectively with a threaded hole, and the second U-shaped plate is mounted to the first screw rod through the threaded holes. The first side plate and the second side plate of the second U-shaped plate abut against two sides of the beam 30 respectively.

In a further embodiment, each mounting assembly further comprises a second screw rod (i.e. the vertical adjusting threaded rod 21) mounted vertically to the U-shaped bended structure 20, and the vertical adjusting threaded rod 21 is configured to match with a threaded hole of in the bottom plate of the U-shaped bended structure 20 and one end of the vertical adjusting threaded rod 21 abuts against the beam 30, such that a rotation of the vertical adjusting threaded rod 21 relative to the U-shaped bended structure 20 moves the U-shaped bended structure 20 vertically relative to the beam 30.

The U-shaped bended structure 20 comprises a U-shaped plate and a first nut fixed on the U-shaped plate (for example, the nut is fixed inside the U-shaped bended structure 20 adjacent the left side plate, as shown in FIGS. 2-3), and the U-shaped bended structure 20 is mounted to the horizontal adjusting threaded rod 13 through the first nut.

The U-shaped bended structure 20 further comprise a second nut fixed to the U-shaped plate (for example, the nut is fixed under or formed integrated with the top plate of the U-shaped bended structure 20, as shown in FIGS. 2-3), and the U-shaped bended structure 20 is mounted to the vertical adjusting threaded rod through the second nut.

In a preferable embodiment, each first component of the at least two mounting assemblies has a different length. For example, in a circumstance that the U-shaped bended structure 12 is connected to the fixation frame 10 via a horizontal supporting arm 11, the horizontal supporting arms 11 in different mounting assemblies have different lengths. In an alternative embodiment, each first component of the at least two mounting assemblies is configured to have a variable length, such that a mounting angle of the display device is adjustable.

Another aspect of the present invention relates to a wall-mounted display device, which comprises a display device and the mounting structure according to any one of the above embodiments.

To be noted, a plurality of components according to the present invention can be implemented in different ways, and they are not limited to a specific form. For example, the first component may be formed as a U-shaped plate, or as a trough, such that the second component can be received in the first component. The second component may be formed as a U-shaped plate, or a C-shaped plate, such that the second component can surround a lower portion of the mounting beam 30, and the second screw rod can be mounted from the lower side of the second component and abut against the lower surface of the mounting beam 30. All these kinds of changes and modification are obvious for those skilled in the art.

Figure 4:
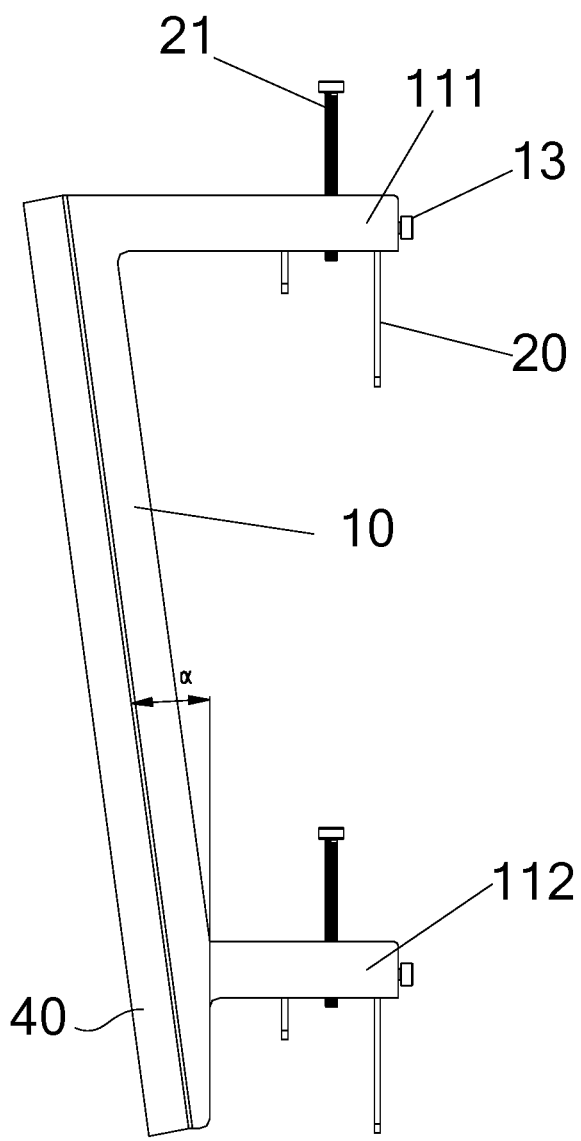
FIG. 4 is an illustrative sectional view showing a mounting structure according to a further embodiment of the present invention.

Therefore, the description below are only relates to specific embodiments as shown in FIGS. 2-4, and other embodiments that are not shown in the attached drawings but fall within the scope of the attached claims are obvious for those skilled in the art.

First Embodiment

As shown in FIG. 2, the mounting structure according to the first embodiment comprises a fixation frame 10 and two mounting assemblies located at an upper portion and a lower portion of the frame 10. The fixation frame 10 is used to fix a display device 40, and the mounting assemblies are mounted to a mounting frame (for example, a beam 30) so as to be mounted on a wall or other fixed devices to support the display device 40.

Each mounting assembly comprises a converted U-shaped bended plate 20, to which a vertical adjusting threaded rod 21 for adjusting a height of the display device 40 relative to the mounting beam 30 is connected via threads. Each end of the U-shaped bended plate is provided with a threaded hole. Specifically, the U-shaped bended plate 20 surrounds the beam 30, and each side wall of the U-shaped bended plate 20 is provided with a threaded hole, or each side wall of the U-shaped bended plate 20 is welded with a nut 14 for cooperating with the horizontal adjusting threaded rod 13.

The fixation frame 10 is a stripe shaped structure provided with a mounting structure at each end thereof. Each of the mounting structure is a U-shaped bended structure 12, and the U-shaped bended plate 20 is received in the U-shaped bended structure 12. Each U-shaped bended structure 12 is provided with a long slot 16 for cooperating with a corresponding vertical adjusting threaded rod 21 mounted to the U-shaped bended plate 20; each of two opposite side walls of the U-shaped bended structure 12 is provided with a smooth hole, and the horizontal adjusting threaded rod 13 is passed through two smooth holes. The horizontal adjusting threaded rod 13 is passed through the U-shaped bended plate 20 and threaded thereto.

Specifically, each mounting assembly further comprises a horizontal supporting arm 11 connected to the fixation frame 10, and the U-shaped bended structure 12 is disposed and fix on the horizontal supporting arm 11 with an opening of the U-shaped bended structure 12 facing downward. As a preferable technical solution, the horizontal supporting arm 11 and the U-shaped bended structure 12 are formed integrally. That is, the horizontal supporting arm 11 utilizes a plate shaped structure, and an end of the horizontal supporting arm 11 away from the fixation frame 10 utilizes a bended plate structure, and a vertical plate is further welded to the horizontal supporting arm 11 so as to form the U-shaped bended structure 12.

When a U-shaped bended plate 20 is received in the U-shaped bended structure 12, the opening of the U-shaped bended plate 20 faces the same direction as the opening of the U-shaped bended structure 12. During assembling, firstly, the U-shaped bended plate 20 is received in the U-shaped bended structure 12, then the vertical adjusting threaded rod 21 is passed through the elongate slot 16 in the U-shaped bended structure 12 and connected to the U-shaped bended plate 20, then the horizontal adjusting threaded rod 13 is passed through a smooth hole in one end of the U-shaped bended structure 12 and threaded to the U-shaped bended plate 20, then the end of horizontal adjusting threaded rod 13 passing through the first smooth hole is passed through another smooth hole in the other end of the U-shaped bended structure 12 and exposed outside of the another smooth hole.

When the horizontal adjusting threaded rod is rotated, the horizontal adjusting threaded rod 13 must be fixed relative to the U-shaped bended structure 12 so as to ensure that the horizontal adjusting threaded rod 13 can move the U-shaped bended plate 20 in the horizontal direction. Specifically, the horizontal adjusting threaded rod 13 is threaded with at least one nut 14, and the head portion 132 of the horizontal adjusting threaded rod 13 and the nut 14 are located outside of the U-shaped bended structure 12 respectively. Preferably, the number of the at least one nut 14 is two, and the two nuts are locknuts 14. Or, a stopper (not shown) may be provided at an end of the horizontal adjusting threaded rod 13 away from the head portion 132 and is welded to the horizontal adjusting threaded rod 13, and the head portion 132 and the stopper are located outside of the U-shaped bended structure 12 respectively. with the above two different ways, the horizontal adjusting threaded rod 13 is prevent from slipping out of the smooth holes, such that a safety is ensured during the displacement.

Moreover, as a preferable technical solution, in order to ensure a stability of the U-shaped bended plate 20 during its displacement in the horizontal direction, each mounting assembly further comprises a smooth rod 15 passing through corresponding U-shaped bended structure 12 and U-shaped bended plate 20, and an axis of the smooth rod 15 is in parallel with an axis of the horizontal adjusting threaded rod 13, as shown in FIG. 3. Specifically, when the U-shaped bended structure 12 is moved by threading the horizontal adjusting threaded rod 13, the smooth rod 15 restrains a relative rotation between the U-shaped bended structure 12 and the U-shaped bended plate 20, so that the threaded connection between the horizontal adjusting threaded rod 13 and U-shaped bended plate 20 will not affect the stability of the U-shaped bended plate 20 during its displacement. Moreover, the smooth rod 15 can also act as a weight supporting member to support a force applied on the U-shaped bended plate 20, so as to prevent a vertical shearing force from being applied to the horizontal adjusting threaded rod 13, so that a resistance to the horizontal adjusting threaded rod 13 is reduced, and thereby a mobility of the whole structure is improved.

Second Embodiment

As shown in FIG. 4, the mounting assembly according to the second embodiment of the present invention is substantially the same as that according to the first embodiment, and the only difference between the first and the second embodiments lies in that, in the second embodiment, the two horizontal supporting arms 11 have different lengths, such that the wall-mounted display device can be suspended at an angle with the vertical direction. Specifically, as shown in FIG. 4, a length of a first horizontal supporting arm 111 is larger than a length of a second horizontal supporting arm 112. Therefore, when the display device 40 is suspended, it forms an angle α with the vertical direction.

As a preferable embodiment, at least one of the horizontal supporting arms 11 can be configured as a telescoping arm, which can be locked at a position to provide a suitable length. Specifically, each of the two horizontal supporting arms 11 is configured as a telescoping arm. With the above configurations, the lengths of the horizontal supporting arms 11 can be adjusted so as to adjust the angle α between the display device and the vertical direction.

An embodiment of the present invention further provides a wall-mounted display device, which comprises the mounting structure according any of the above embodiments and a display device 40 mounted to the mounting structure.

In the above embodiments, the fixation frame 10 is used to fix the display device 40, the mounting assemblies are clamped to the mounting beam 30, and the fixation frame 10 and the mounting assemblies are connected by the horizontal adjusting threaded rod 13 passing through the smooth holes formed in the U-shaped bended structure 12. The horizontal adjusting threaded rod 13 is threaded with the U-shaped bended plate 20, so that when a mounting assembly is adjusted in the horizontal direction, a rotation of the horizontal adjusting threaded rod 13 causes a relative displacement between the U-shaped bended plate 20 and the U-shaped bended structure 12, therefore the position of the display device 40 can be adjusted forward or backward in the horizontal direction, and the adjustment of the display device 40 is facilitated.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A mounting structure for a display device, comprising at least two mounting assemblies, each mounting assembly comprising:
   a first component mounted securely to the display device;
   a second component mounted to a beam; and
   a first screw rod connected to the first component and the second component,
   wherein the first component comprises a first through hole and a second through hole;
   wherein the first screw rod comprises:
     a threaded rod body passing through the first through hole and the second through hole;
     a first stopper secured on the threaded rod body; and
     a second stopper secured on the threaded rod body,
     wherein the first stopper is configured to abut against a side of the first through hole away from the second through hole and the second stopper is configured to abut against a side of the second through hole away from the first through hole, such that the first screw rod is configured to be rotatable and non-displaceable relative to the first through hole and the second through hole; and
   wherein the second component is configured to be mounted to the first screw rod in a non-rotatable manner.

2. The mounting structure according to claim 1, wherein each mounting assembly further comprises a second screw rod mounted vertically to the second component, and the second screw rod is configured to match with a threaded hole of the second component and one end of the second screw rod abuts against the beam, such that when the second screw rod rotates relative to the second component, the second component moves vertically relative to the beam.

3. The mounting structure according to claim 1, wherein the second component is mounted to the first screw rod at a position between the first through hole and the second through hole.

4. The mounting structure according to claim 3, wherein the first component comprises a first rotation preventing portion, the second component comprises a second rotation prevention portion cooperating with the first rotation prevention portion, such that the second component is non-rotatable relative to the first component.

5. The mounting structure according to claim 3, wherein each mounting assembly further comprises a smooth rod passing through the first component and the second component, such that the second component is non-rotatable relative to the first component.

6. The mounting structure according to claim 4, wherein the first component comprises a first abutting surface against the second component, the second component comprises a second abutting surface against the first component, and the first abutting surface and the second abutting surface are in parallel with an axial direction of the first screw rod.

7. The mounting structure according to claim 6, wherein the first component is formed by a first U-shaped plate comprising a bottom plate and a first side plate and a second side plate at two sides of the bottom plate, and the first through hole and the second through hole are formed respectively in the first side plate and the second side plate.

8. The mounting structure according to claim 7, wherein the first abutting surface is formed on the bottom plate of the first U-shaped plate.

9. The mounting structure according to claim 6, wherein the second component is formed by a second U-shaped plate comprising a bottom plate and a first side plate and a second side plate at two sides of the bottom plate, and the second abutting surface is formed on the bottom plate of the second U-shaped plate.

10. The mounting structure according to claim 9, wherein the first side plate and the second side plate of the second U-shaped plate are formed respectively with threaded holes, the second U-shaped plate is mounted to the first screw rod through the threaded holes.

11. The mounting structure according to claim 9, wherein the first side plate and the second side plate of the second U-shaped plate abut against two sides of the beam respectively.

12. The mounting structure according to claim 11, wherein each mounting assembly further comprises a second screw rod mounted vertically to the second component, and the second screw rod is configured to match with a threaded hole in the bottom plate of the second component and one end of the second screw rod abuts against the beam, such that rotation of the second screw rod relative to the second component moves the second component vertically relative to the beam.

13. The mounting structure according to claim 1, wherein the second component comprises a U-shaped plate and a first nut fixed on the U-shaped plate, and the second component is mounted to the first screw rod through the first nut.

14. The mounting structure according to claim 13, wherein the second component further comprise a second nut fixed to the U-shaped plate, the second component is mounted to the second screw rod through the second nut.

15. The mounting structure according to claim 14, wherein the first nut is disposed on a bottom plate of the U-shaped plate, and the second nut is disposed on a side plate of the U-shaped plate.

16. The mounting structure according to claim 1, wherein first components of the at least two mounting assemblies have different lengths respectively.

17. The mounting structure according to claim 1, wherein the first component of each of the at least two mounting assemblies is configured to have a variable length, such that a mounting angle of the display device is adjustable.

18. A wall-mounted display device, comprising a display device and the mounting structure according to claim 1.

* * * * *